United States Patent
Garris

(10) Patent No.: US 6,663,991 B2
(45) Date of Patent: *Dec. 16, 2003

(54) FUEL CELL PRESSURIZATION SYSTEM

(75) Inventor: Charles Alexander Garris, Vienna, VA (US)

(73) Assignee: The George Washington University, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/942,303

(22) Filed: Aug. 30, 2001

(65) Prior Publication Data

US 2002/0039673 A1 Apr. 4, 2002

Related U.S. Application Data

(62) Division of application No. 09/679,053, filed on Oct. 3, 2000, now Pat. No. 6,434,943.

(51) Int. Cl.⁷ ............................................. H01M 8/04
(52) U.S. Cl. ............................. 429/25; 429/26; 429/17
(58) Field of Search ............................. 429/25, 22, 26, 429/34; 417/178

(56) References Cited

U.S. PATENT DOCUMENTS

| | | |
|---|---|---|
| 3,976,507 A | 8/1976 | Bloomfield .................. 136/86 |
| 4,759,997 A | 7/1988 | Ohyauchi et al. ............. 429/19 |
| 4,988,580 A | 1/1991 | Ohsaki et al. ................ 429/19 |
| 5,198,312 A | 3/1993 | Irino et al. .................... 429/26 |
| 5,248,566 A | 9/1993 | Kumar ......................... 429/19 |
| 5,434,016 A | 7/1995 | Benz ............................ 429/13 |
| 5,543,238 A | 8/1996 | Strasser ....................... 429/17 |
| 5,645,950 A | 7/1997 | Benz ............................ 429/13 |
| 6,033,794 A | 3/2000 | George et al. ................ 429/24 |
| 6,063,515 A | 5/2000 | Epp et al. ..................... 429/17 |
| 6,124,052 A | 9/2000 | Katoh et al. .................. 429/33 |
| 6,203,935 B1 | 3/2001 | Stuhler et al. ................ 429/13 |
| 6,242,119 B1 | 6/2001 | Komura et al. ............... 429/17 |
| 6,268,074 B1 | 7/2001 | Siepierski et al. ............ 429/13 |
| 6,434,943 B1 * | 8/2002 | Garris ........................ 60/649 |

* cited by examiner

Primary Examiner—Stephen Kalafut
Assistant Examiner—R Alejandro
(74) Attorney, Agent, or Firm—Charles A. Garris, Jr.

(57) ABSTRACT

A thermally energized fuel-cell pressurization system and humidity control system utilizing a compressor-expander, an ejector, and a steam generator is disclosed. The system can be more compact and energy efficient than comparable electrically-based pressurization systems when incorporated into the fuel cell reformation and water management systems as a whole.

7 Claims, 2 Drawing Sheets

FUEL CELL PRESSURIZATION SYSTEM

CROSS-REFERENCE TO RELATED APPLICATIONS

This application is a division of U.S. application Ser. No. 09/679,053 which was filed Oct. 3, 2000 now U.S. Pat. No. 6,434,943 under the same inventor and entitled: PRESSURE EXCHANGING COMPRESSOR-EXPANDER AND METHODS OF USE.

FIELD OF INVENTION

This invention relates to electro-chemical fuel cell systems, and, more particularly, to the integrated pressurization and moisturization of the fuel cell.

BACKGROUND OF INVENTION

During the course of the $20^{th}$ Century, science and engineering have brought us to an era whereby every American enjoys the availability of abundant energy as well as advanced technology for heating and air-conditioning of homes, transportation, and industry. Nevertheless, these wonders of modern society have come at a severe price to our global environment and to our reserves of nonrenewable natural resources. Fossil fueled electrical power generation and automobiles have increased the level of carbon dioxide in the atmosphere to the point where deleterious global warming effects on the environment are predicted. Furthermore, due to the release of chlorofluorocarbons (CFC's) from conventional refrigeration and air conditioning systems, the ozone layer protecting the earth from deadly ultraviolet radiation is being depleted, with serious projected consequences for mankind. This crisis is considered so serious that 159 nations, including the United States, met in Kyoto, Japan in December of 1997 and signed a treaty designed to limit the buildup of carbon dioxide and other greenhouse gases in our environment. Immediately following the signing of the treaty, there was an outpouring of concern that meeting the targets outlined in Kyoto would be impossible without either modifying radically the American way of life, or of finding new energy-efficient and non-polluting technologies.

According to "Fuel Cells" by McDougall, John Wiley & Sons, 1976, page 78, the first successful working fuel cell was produced by F. T. Bacon in 1957. This fuel cell had a working temperature of 200° C. and a pressure of 20–40 atm. For all fuel cells, the well known Nernst equation predicts that the output voltage of a fuel cell should increase with the partial pressures of fuel and oxygen. For many types of fuel cells, the power output and the efficiency of the fuel cell stack generally increases with pressure as well. For example, the "Fuel Cell Handbook" by Appleby, Van Nostrand-Reinhold, 1989, discusses the improvements in power output and efficiency obtained by pressurizing various types of fuel cells including the Phosphoric Acid Fuel Cell (PAFC), the Molten Carbonate Fuel Cell (MCFC), and the Solid Oxide Fuel Cell (SOFC). However, in all cases, this improvement in performance must be paid for by the energy input required to compress the reactants and the increased complexity of the system. In theory, an ideal compressor-expander can pressurize the fuel cell with a minimal energy requirement if the compressor and expander operate at 100% efficiency. In such a system, the fuel cell is pressurized on the air side by a compressor, and the oxygen depleted exhaust gases energize an expander which drives the compressor, requiring very little additional energy input. In practice, component efficiencies become very crucial, and substantial amounts of external energy must be supplied, thereby lowering the improvement in overall system efficiency gained through pressurization. With current technology, this can involve very expensive and bulky machinery. For this reason, in the current state-of-the-art, PAFC's, MCFC's, and SOFC's, are normally operated at atmospheric pressure.

While the advantages and disadvantages of pressurization apply to all fuel cells, they have recently become of prime importance in the Department of Energy "Partnership for a New Generation of Vehicles" (PNGV) program in fuel cells for automobiles where the goal is to obtain a vehicle which will achieve 80 miles/gallon of fuel. Current emphasis in the PNGV fuel cell vehicle program is to use the Proton Exchange Membrane Fuel Cell (PEMFC) since this type offers reduced weight and size, faster start-up, operation at room temperature, and potentially lower cost. Such a fuel cell is normally pressurized to about 3 atmospheres on the air side, and with hydrogen rich gas produced by an on-board gasoline reformer. Kumar (U.S. Pat. No. 5,248,566) calls for PEMFC operating pressures of about 2–5 atmospheres on the hydrogen side. With PEMFC's in the automotive environment, pressurization is particularly important since the size of the stack must be minimized while the power output maximized. Also, since the PEMFC has a solid fluorocarbon electrolyte which must be humidified in order to function, a sufficiently high water vapor pressure without diluting the hydrogen and oxygen can only be obtained if the system is pressurized. Thus, a critical technology in the success of a fuel-cell-powered automobile is a high efficiency compressor-expander, capable of a wide dynamic range of operation, low in cost, low in volume and weight, and capable of humidity control. An objective of the present invention is to provide a system which can meet these requirements.

SUMMARY OF INVENTION

In the development of new technologies which will enable us to continue to enjoy our prosperity yet preserve the environment, there has been a profound need for high efficiency compressor-expanders for pressurizing fuel cells. This is an area of technology whereby improvements can have a major global impact on the amount of the energy we consume and the pollution we create, particularly with regard to greenhouse gases and ozone layer depleting chemicals. fluid at the discharge of the nozzle is substantially reduced.

This disclosure further provides a pressurization system for fuel cell power plants which is particularly useful for automotive applications using PEM fuel cells. The disclosure recited herein has a compressor-expander which is powered by exhaust gases from the fuel cell and discharges said exhaust gas to the atmosphere. Said compressor-expander receives clean secondary air from the ambient and compresses it for discharge into the secondary inlet of an ejector. The primary of said ejector is steam provided from a boiler. The steam provides the excess energy needed to make up for inherent losses, and it also provides needed moisture for the fuel cell. The disclosed system can be more compact than comparable compressor-expander-motor combinations utilizing conventional machinery.

DESCRIPTION OF THE PREFERRED EMBODIMENTS

Figure 1:
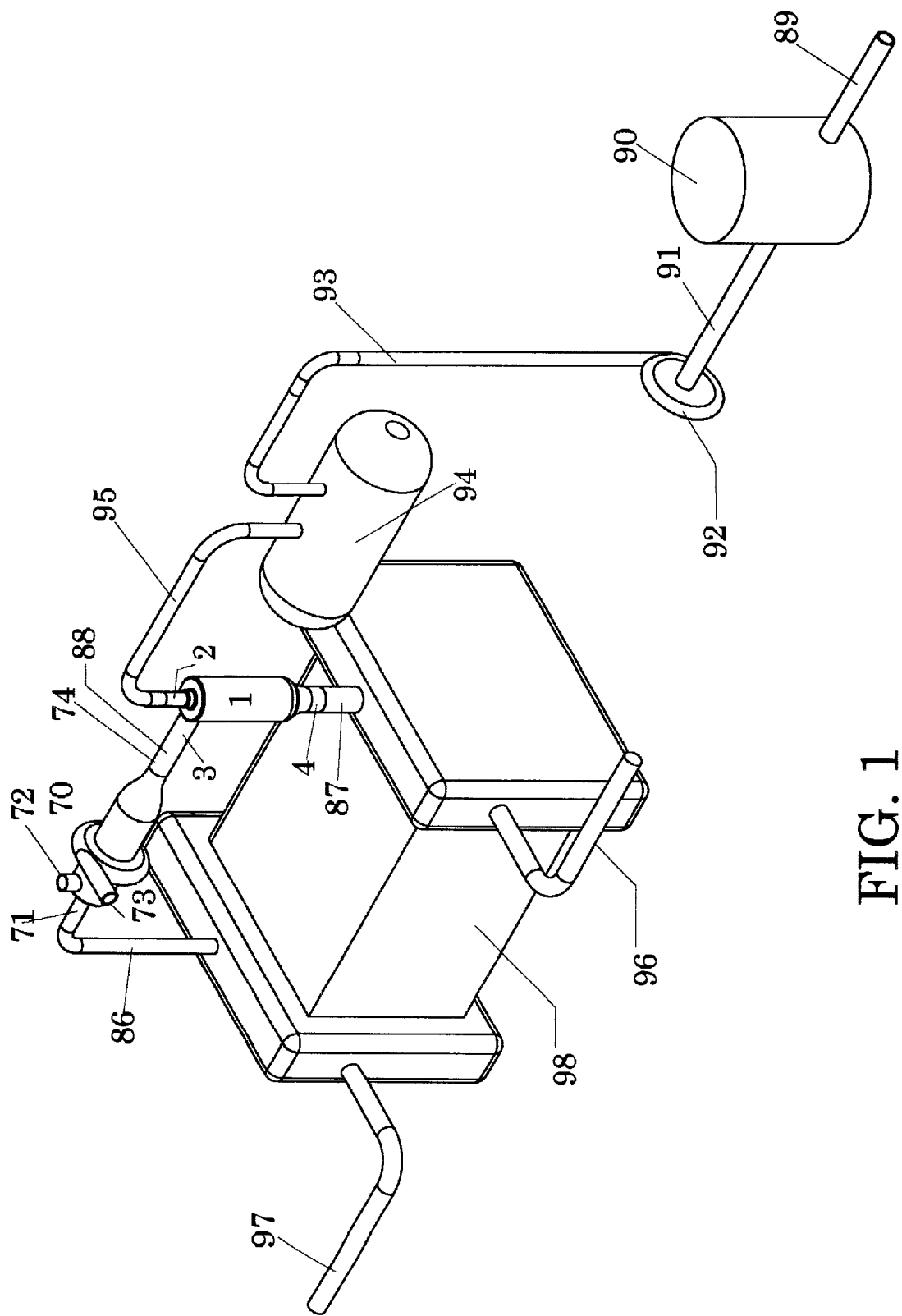
FIG. 1 discloses a preferred embodiment of a fuel-cell pressurization system of the present invention.

The combination of an ejector 1 and a compressor-expander 70 of this invention is ideally suited for use in pressurizing and moisturizing environmentally friendly fuel-cell power generation systems (e.g., Kumar, U.S. Pat. No. 5,248,566). A basic embodiment of the use of this invention in such a system is illustrated in FIG. 1. The pressurization system is shown on the oxygen-side of the fuel cell 98, however, pressurization on the hydrogen-side is also anticipated by the current invention, particularly when partial oxidation reformers which require pressurized air to convert fuel to hydrogen are used. In the embodiment shown, the fuel-cell 98 is provided oxygen from the ambient air through secondary inlet conduit 72 of pressure-exchange compressor-expander 70. Pressurized oxygen-depleted but moisture rich exhaust from the oxygen-side of said fuel cell 98 is extracted through conduit 86 and is introduced into said pressure-exchange compressor-expander 70 through primary inlet conduit 71. The de-energized first-fluid is brought through outlet conduit 73 which discharges to the open atmosphere. Second-fluid consists essentially of a major proportion of clean air, and a smaller proportion of recirculated, moisture-rich, primary fluid. Said second-fluid is discharged through outlet conduit 74 and is brought through conduit 88 to the secondary fluid inlet conduit 3 of pressure-exchange ejector 1. Ejector 1 is energized with steam which is brought to primary inlet conduit 2 from boiler 94 through conduit 95. Said boiler 94 can be energized by electric heating elements, combustion, or waste heat from the reforming process or elsewhere. Liquid water is brought through conduit 89 from a water-management system to holding tank 90 from which pump 92 receives water through conduit 91 and discharges liquid water to boiler 94 through conduit 93. In ejector 1, the mixture of the energized air and the de-energized steam are together discharged through outlet conduit 4 and brought to the oxygen-side of fuel cell 98 through conduit 87. Hydrogen-rich fuel, generally from a reformer, is introduced to the fuel cell 98 through conduit 96, and hydrogen-depleted products are discharged through conduit 97.

In this embodiment of the invention, two-stage operation can enable the attainment of a high pressure in the fuel cell 98. Five atmospheres would be quite reasonable. Furthermore, no heavy electric motors or conventional machinery are needed, thus saving appreciable weight, volume and cost. The compatibility with the steam energizing and the high moisture content required by proton-exchange-membrane fuel cells is particularly advantageous, although the system can be used with phosphoric acid fuel cells, molten carbonate fuel cells, solid oxide fuel cells, and others as well since all fuel cells can benefit from pressurization. By the use of appropriate mixing control, combining of primary and secondary flows as previously discussed, the system offers further accurate means of moisture control. Cold start-up for proton exchange membrane fuel cell vehicles can be accomplished by the use of electric heating elements in the boiler. The time required to build up pressure is governed by the design of the electrical boiler heating elements and the mass of water contained within boiler 94. However, with proper design, pressurization in less than one minute should be possible. It should also be noted that this embodiment of the invention can be used on the hydrogen side of the fuel cell as well where the presence of the energizing steam may be used in the reforming process.

Figure 2:
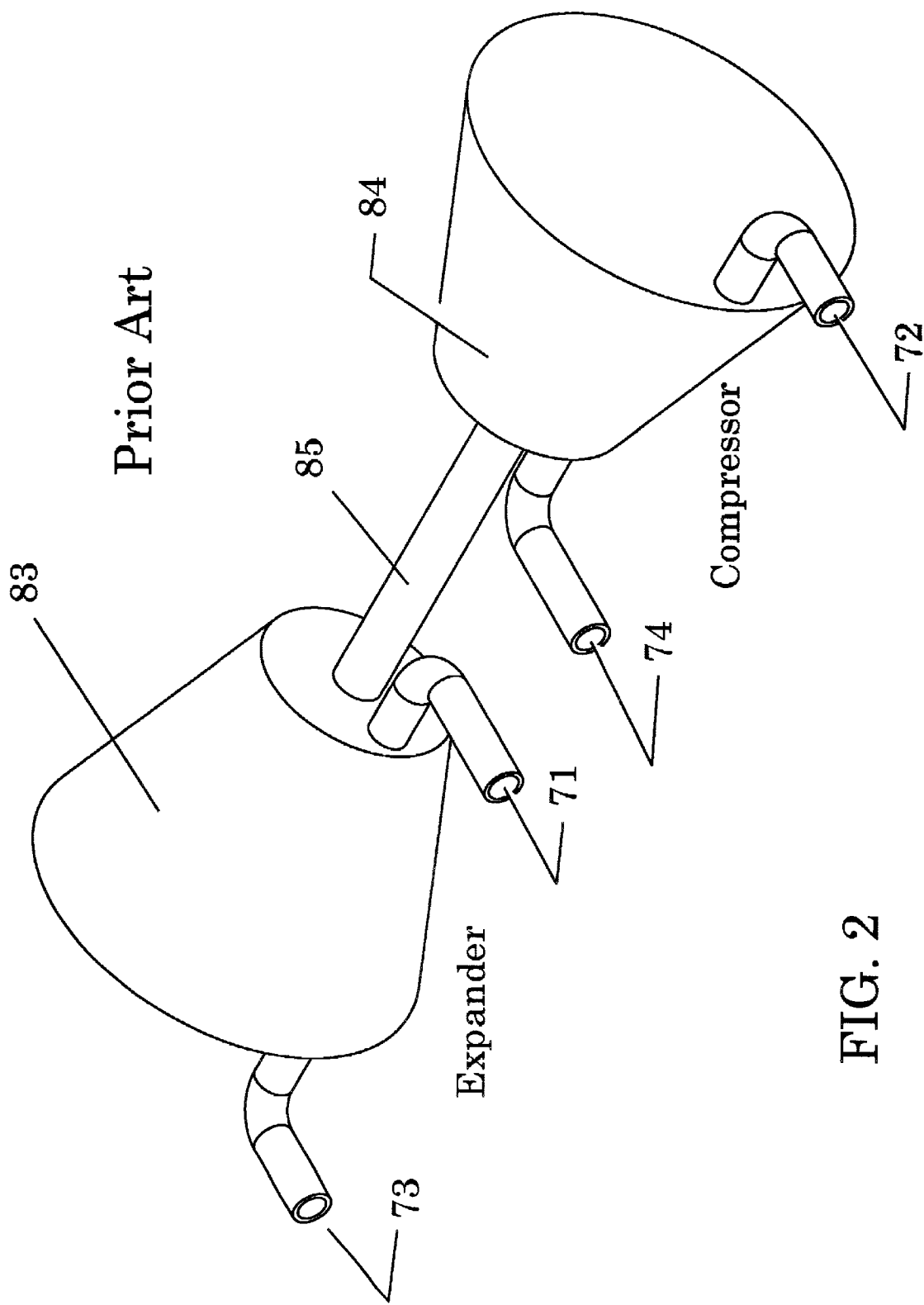
FIG. 2 shows an example of a typical prior art compressor-expander.

Common compressor-expanders are comprised of an expander which converts energetic primary fluid power into mechanical energy which then drives a separate compressor which adds fluid power to a secondary fluid. These machines generally utilize expanders and compressors which individually operate as either positive displacement machines such as piston-type reciprocating, or lobe, or twin-screw, or non-positive-displacement turbo-machines. A typical prior art compressor-expander is shown in FIG. 2. It can be seen that the energetic primary fluid stream is applied through inlet conduit 71 to the expander 83, and is discharged through outlet conduit 73. The secondary fluid is applied through inlet conduit 72 to the compressor 84 and is discharged separately through outlet conduit 74. Compressor 84 is driven through shaft 85 by expander 83. Such compressor-expanders are used in many applications of commercial or industrial importance. For example, compressor-expanders are used for fuel cell pressurization, turbo-charging internal combustion engines, and for air-cycle heat pumps.

A less common but important type of compressor expander uses the pressure-exchange principle with direct contact between the primary and secondary fluids. One well known example of this type of compressor expander is of the wave-rotor type, which was invented by Seipple (U.S. Pat. No. 2,399,394), and modified and improved upon by, Spalding (U.S. Pat. No. 3,074,620), Berchtold (U.S. Pat. No. 3,012,708), Komaur (U.S. Pat. No. 4,398,868), and Paxson (U.S. Pat. No. 5,267,432). It is anticipated that the present invention may be practiced with the use of such compressor expanders.

The invention claimed is:
1. A pressurized fuel cell system comprising:
 a. a fuel cell (98);
 b. a compressor-expander (70);
 c. an ejector (1);
 d. a boiler (94);
 wherein, pressurized and energetic products of reaction from said fuel cell (98) are conducted through a conduit (86) to the primary fluid inlet conduit (71) of said compressor-expander (70) wherein said products of reaction are de-energized and discharged from the system, said primary fluid imparting energy on a reactant-rich secondary fluid which is introduced to said compressor-expander through secondary fluid inlet conduit (72) and thereafter compressed in said compressor-expander (70) and discharging into said ejector (1) through a secondary fluid inlet conduit (3), said ejector (1) being energized by vapor conducted to the said primary fluid inlet conduit (2) and provided by said boiler (94); said reactant-rich secondary fluid being further pressurized in said ejector (1) and having the mixture of the said vapor primary fluid and said reactant rich secondary fluid discharged through an outlet conduit (4) into said fuel cell (98).

2. A fuel cell (98) pressurization system in accordance with claim 1 whereby said ejector (1) is a pressure-exchange ejector.

3. A fuel cell (98) pressurization system in accordance with claim 1 whereby said reactant rich secondary fluid is air.

4. A fuel cell (98) pressurization system in accordance with claim 1 whereby said reactant rich secondary fluid is reformate.

5. A fuel cell (98) pressurization system in accordance with claim 1 wherein said fuel cell (98) is selected from a group consisting of proton exchange membrane fuel cells, phosphoric acid fuel cells, molten carbonate fuel cells, and solid oxide fuel cells.

6. A fuel cell (98) pressurization system in accordance with claim 1 whereby said compressor-expander (70) is selected from a group consisting of turbo-compressor-expanders, positive displacement compressor-expanders, wave-rotor compressor-expanders, and pressure-exchange compressor-expanders.

7. A fuel cell pressurization system in accordance with claim 1 whereby said vapor is steam.

* * * * *